United States Patent [19]

Pennell et al.

[11] 4,070,241
[45] Jan. 24, 1978

[54] NUCLEAR REACTOR REMOVABLE RADIAL SHIELDING ASSEMBLY HAVING A SELF-BOWING FEATURE

[75] Inventors: William E. Pennell, Greensburg; Joseph E. Kalinowski, Smithton; Robert N. Waldby, New Stanton; John A. Rylatt, Monroeville; Daniel V. Swenson, Greensburg, all of Pa.

[73] Assignee: The United States of America as represented by the United States Department of Energy, Washington, D.C.

[21] Appl. No.: 769,371

[22] Filed: Feb. 16, 1977

[51] Int. Cl.² .............................................. G21C 11/00
[52] U.S. Cl. ......................................... 176/87; 176/40
[58] Field of Search ............................... 176/87, 40, 85

[56] References Cited

U.S. PATENT DOCUMENTS

| 3,549,491 | 12/1970 | Johnson | 176/87 |
| 3,753,856 | 8/1973 | Ash | 176/87 |
| 3,964,969 | 6/1976 | Brynsvold et al. | 176/40 |

*Primary Examiner*—Harvey E. Behrend
*Attorney, Agent, or Firm*—Dean E. Carlson; Frank H. Jackson; James W. Weinberger

[57] ABSTRACT

A removable radial shielding assembly for use in the periphery of the core of a liquid-metal-cooled fast-breeder reactor, for closing interassembly gaps in the reactor core assembly load plane prior to reactor criticality and power operation to prevent positive reactivity insertion. The assembly has a lower nozzle portion for inserting into the core support and a flexible heat-sensitive bimetallic central spine surrounded by blocks of shielding material. At refueling temperature and below the spine is relaxed and in a vertical position so that the tolerances permitted by the interassembly gaps allow removal and replacement of the various reactor core assemblies. During an increase in reactor temperature from refueling to hot standby, the bimetallic spine expands, bowing the assembly toward the core center line, exerting a radially inward gap-closing-force on the above core load plane of the reactor core assembly, closing load plane interassembly gaps throughout the core prior to startup and preventing positive reactivity insertion.

6 Claims, 4 Drawing Figures

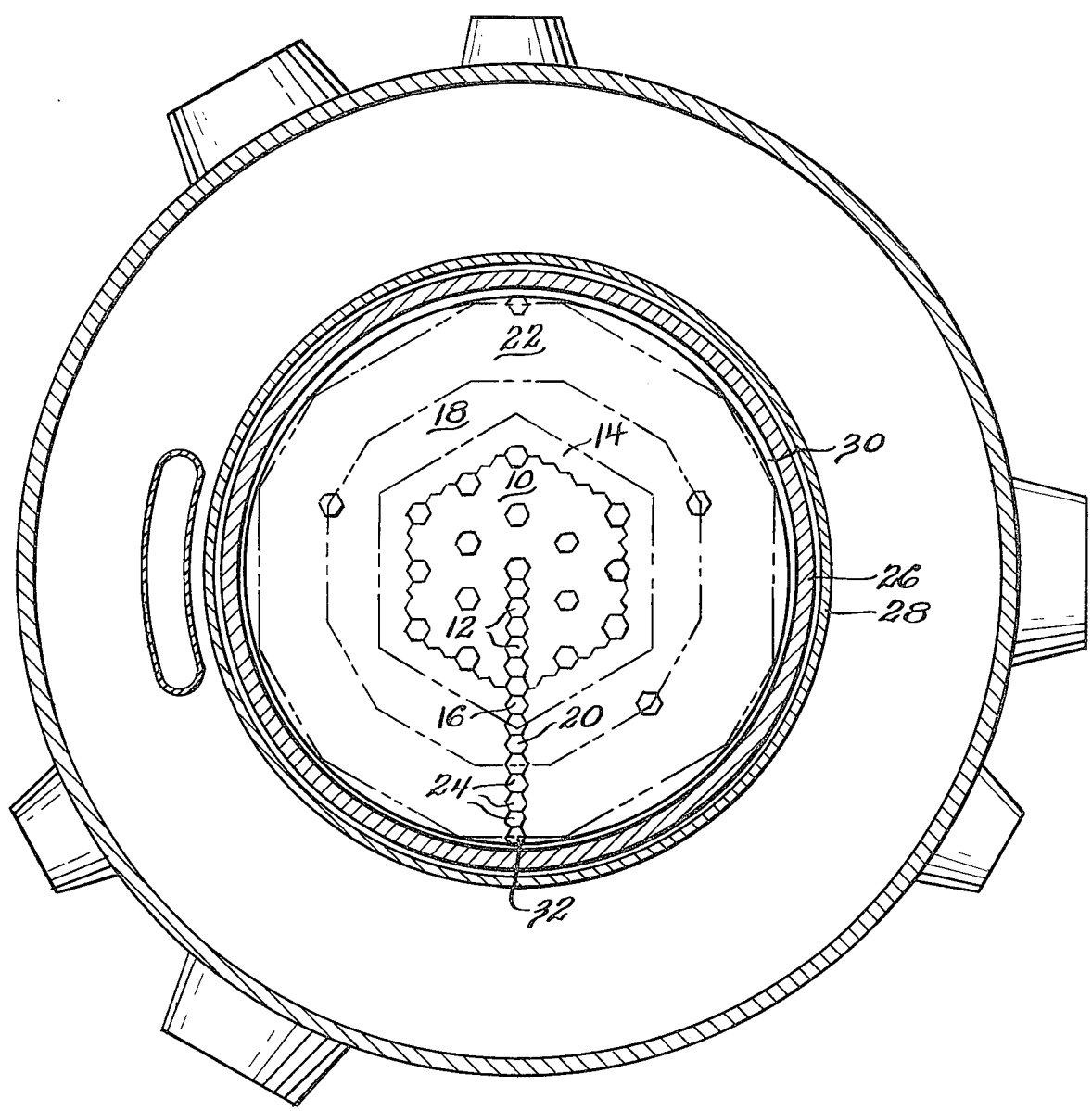

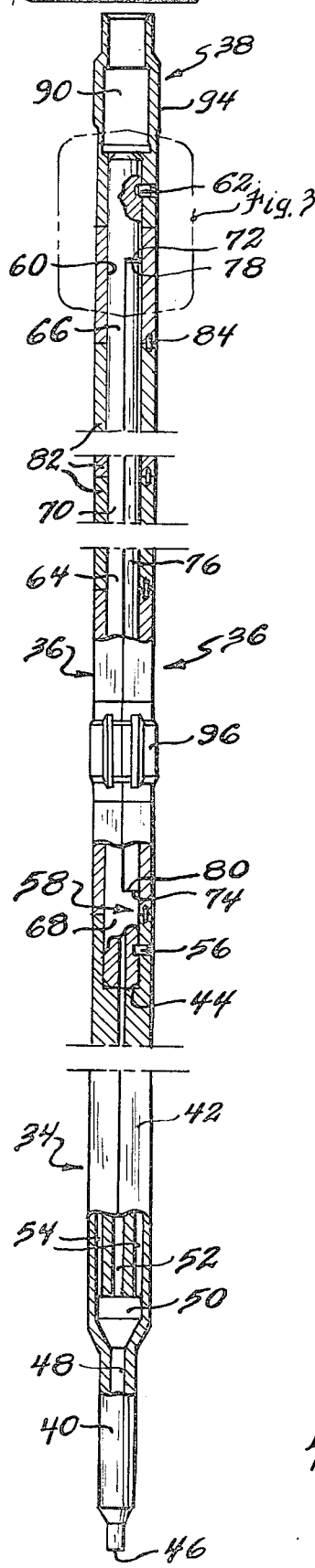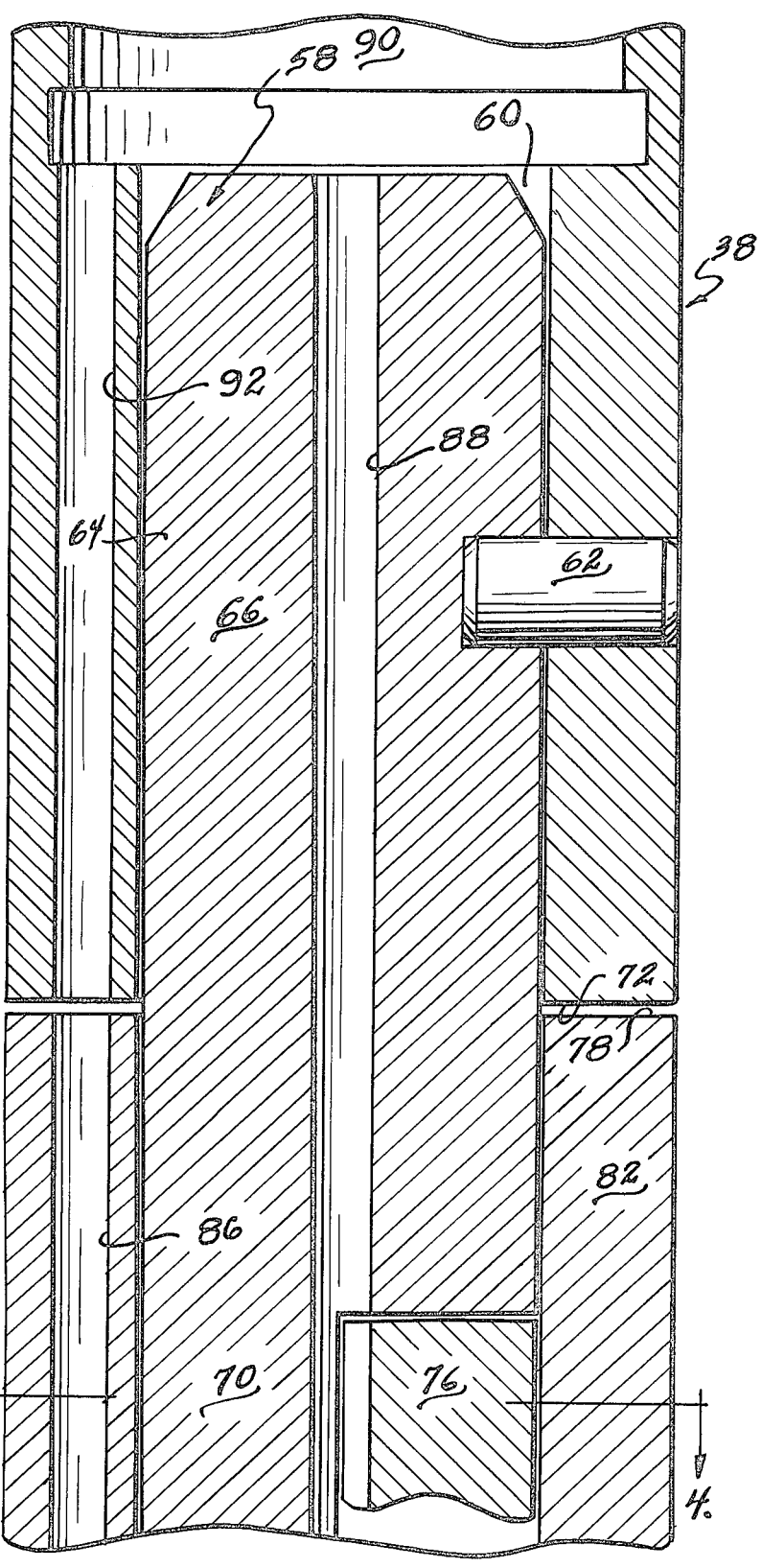

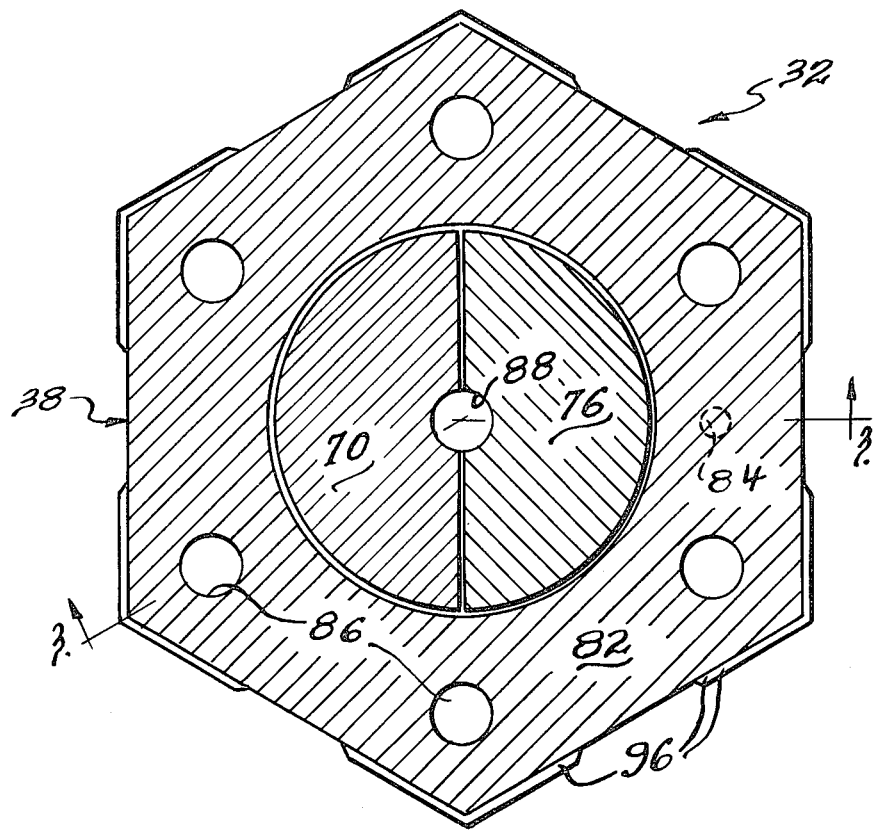

NUCLEAR REACTOR REMOVABLE RADIAL SHIELDING ASSEMBLY HAVING A SELF-BOWING FEATURE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the art of nuclear reactors and in particular to the core restraint system of a nuclear reactor. A nuclear reactor includes a pressure vessel into which a heat-transfer fluid, typically sodium for fast-breeder reators, is pumped under pressure. The sodium flows through the core and is heated; the hot sodium emerges from the vessel and flows to electrical power-generating equipment. Within the vessel there are the core components. Typically these components include fuel-rod bundles or assemblies, control-rod assemblies, blanket fertile material or fertile rod assemblies and removable radial shielding assemblies. These assemblies fit into a core support structure which serves the purpose of locating, supporting and distributing coolant to the core. Surrounding and providing axial restraint for these assemblies are core restraint former rings which also provide for restraining deformation of the core.

One of the functions of the core restraint system is to prevent bowing motions in the fueled regions of the reactor assemblies which add positive reactivity of such rate and magnitude as to result in a positive power reactivity coefficient. These bowing motions usually result from lateral temperature gradients that are established in the reactor assemblies as the reactor is brought to power. Undesirable bowing motions are limited by providing assembly contact pads on the core assemblies at appropriately chosen planes. In the presently described liquid-metal-cooled fast-breeder reactor, load pads are provided each assembly just above the fissile and fertile portion of the core, called the above core load plane (ACLP), and at the top of each assembly, referred to as the top load plane (TLP). These pads assures that once interassembly gaps are closed at the load (or contact) planes, bowing of the fueled regions of the reactor assemblies is radially outward as the reactor is brought to power. The reactivity characteristics of fast reactors are such that expansion of the fueled region adds negative reactivity. Thus the outward bowing motion of the fueled region as the reactor is brought to power will enhance the negative source reactivity coefficient.

In order to facilitate reactor core refueling, some space or gaps must be present at the load planes at reactor refueling temperature, which is about 400° F., to prevent undue stress on the assemblies during withdrawal and insertion. If these interassembly spaces or gaps at the load planes are not closed prior to reactor startup, bowing motions of the fueled regions of the reactor assemblies will be inward during power ascent, adding positive reactivity until the load plane interassembly gaps are closed. The significant sources of reactivity changes other than control motion in a sodium-cooled fast-breeder reactor include radial fuel and blanket assembly motion and the doppler effect. As the fuel temperature increases, the doppler effect results in the addition of negative reactivity. In a reactor in which the assembly lateral temperature gradients are radially oriented with the high temperatures on the inboard side of the assemblies, the positive reactivity insertion may exceed the negative reactivity additions and result in a positive reactivity coefficient unless assembly motions are closely controlled.

SUMMARY OF THE INVENTION

We have developed a removable radial shielding assembly which will control the above-defined reactivity problem by closing the load plane interassembly gaps prior to reactor startup while permitting the interassembly gaps to exist at refueling temperature to facilitate the removal and insertion of reactor assemblies without undue stress on the assemblies. Accordingly, the shielding assembly of the present invention comprises a relatively short elongated base section, a relatively long flexible center section, and a short top section. The base section contains a lower nozzle portion for inserting the assembly into the reactor core support structure and for serving as the coolant inlet for the assembly, and an upper portion. The center sections extends upward from the upper portion of the base section and consists of an axial rod-shaped flexible spine assembly, and a plurality of short tubular-shaped shielding sections stacked one above the other on the spine and slidable longitudinally relative to each other as the spine bows in response to temperature variations. The spine assembly, whose lower end is inserted into the upper portion of the base assembly, is constructed of thermally sensitive bimetallic material, whereby a predetermined increase in temperature will cause the spine to bow laterally in a predetermined direction. The top section is mounted on on the upper end of the spine extending upward from the center section a short distance. A plurality of longitudinal channels extend through the assembly from the nozzle to the top section for passing coolant through the assembly.

Assemblies equipped with this feature are located in the outer row or outer several rows of the removable shielding section. The assemblies equipped with the bimetallic spines are oriented so that collectively they provide a radially inward force sufficient to close the interassembly gaps at the load planes of the contained assemblies as the reactor temperature is brought from refueling to hot standby.

BRIEF DESCRIPTION OF THE DRAWINGS

FIG. 1 is a view in transverse section showing the core components.

FIG. 2 is a view partially in longitudinal section and partially in elevation of the assembly of the invention.

FIG. 3 is a close-up longitudinal sectional view of the outlined portion of FIG. 2 taken along lines 3—3 of FIG. 4.

FIG. 4 is a cross-sectional view taken along lines 4—4 of FIG. 3.

DETAILED DESCRIPTION OF THE INVENTION

Referring now to FIG. 1, the core includes an inner zone 10 of fuel assemblies 12 of lower enrichment and an outer zone 14 of fuel assemblies 16 of higher enrichment. Around the zone 14 there is a radial blanket zone 18 of radial blanket assemblies 20. Around the zone 18 there is a zone 22 of removable radial shielding assemblies 24 surrounded by a peripheral row of flexible radial shielding assemblies 32. Outward the removable shielding 24 is a fixed shield 26 enclosed by the core barrel 28. Several horizontal core restraint former rings 30 are spaced vertically about the inner surface of fixed shield 26 for restraining deformation of the core. Removable radial shield assemblies 24, fixed shield 26 and core restraint former rings 30 make up the core restraint system.

Referring to FIGS. 2, 3 and 4, the flexible radial shielding assembly 32 of the invention, which is generally hexagonal in cross section, consists of a base section 34, a long center section 36 and a short top section 38. Base section 34 includes a lower nozzle end 40 of circular cross section for inserting the assembly into the reactor core support plate, and an upper portion 42 containing large axial opening 44. At the bottom of nozzle end 40 is coolant inlet 46 opening to axial coolant passage 48 leading upward to coolant distribution chamber 50 just above the nozzle. Extending upward from chamber 50 are a plurality of longitudinal coolant channels including axial channel 52 extending to axial opening 44, and a plurality of evenly spaced peripheral channels 54 extending to the top base 34.

Inserted into axial opening 44 is the lower end of rod-shaped spine assembly 58 which is held in place by lower pin 56. Assembly 58 extends upward through the axis of center section 36 into axial opening 60 in the bottom of top section 38 where it is held in place by upper pin 62. Spine assembly 58 consists of main rod 64 having upper and lower portions 66 and 68 respectively which are circular in cross section, and elongated narrow central portion 70, semicircular in cross section with upper and lower transverse end walls 72 and 74 respectively. The assembly is constructed of a material having a relatively low coefficient of thermal expansion such as nickel alloy 718. Adjacent central portion 70, also semicircular in cross section, is loose fitting elongated insert 76 having upper butt end 78 spaced from upper end wall 72 and lower butt end 80 resting on lower end wall 74 to complete the spine assembly. Insert 76 is constructed of material having a relatively high coefficient of thermal expansion such as 316 stainless steel. Stacked one above the other along the length of spine assembly 58 are a plurality of relatively short tubular-shaped shielding sections 82, slidable longitudinally along the spine. Joining each tubular sections 82 with each other and with base section 34 are loose-fitting tie pins 84 to minimize rotational movement of the sections relative to each other and to base section 34 while permitting longitudinal movement in response to lateral bowing movement of spine assembly 58. A plurality of evenly spaced peripheral longitudinal coolant channels 86 in the sections mate with each other and with channels 54 in base section 34 while axial channel 88 in spine assembly 58 mates with axial channel 52 in base 34 to permit a flow of coolant through the assembly 32.

The top section 38 which extends upward a short distance from the center section fits over the upper end of spine assembly 58 to retain the tubular sections on the spine. Section 36 has a large axial central coolant outlet 90 which communicates with axial coolant channel 86 in spine assembly 58 and a plurality of peripheral longitudinal coolant channels 92 which join longitudinal channels 86 in shielding sections 82 with outlet 90 to permit the flow of coolant from the assembly.

A built-up top load pad 94 (TLP) around the exterior of top section 38 and a built-up core load pad 96 (ACLP) around the exterior of a shielding assembly located just above the top of the reactor core for transferring assembly loads within the core restraint system resulting from the bowing motion of the shielding assembly completes the assembly.

The temperature at which bowing of the shielding assembly 32 commences is controlled by the total amount of spacing between the upper end wall 72 and the upper butt end 78 of insert 76. A small space, for example 0.035 inch at 70° F. between the butt end 70 and the end wall 72 will allow expansion of insert 76 from start-up temperature to a predetermined temperature, typically refueling temperature. As the temperature continues to increase above refueling temperature, insert 76 elongates more rapidly than the central portion 70 so that butt ends 78 and 80 push against end walls 72 and 74 respectively. Continued increase in temperature will place additional loads on end walls 72 and 74 resulting in bowing and lateral deflection of the assembly. A space, typically 0.100 inch at 70° F., between the upper shielding section 82 and top section 38 will permit longitudinal movement of sections 82 along spine assembly 58 when bowing occurs.

In operation, the bimetallic assemblies are placed in the peripheral or outer row of the radial shield assemblies as shown in FIG. 1 so that as hot standby temperature is reached, bowing of each assembly will occur toward the core center. The small space, left between the top of insert 76 and upper end wall 72, will just close as the temperature of the reactor core increases to about 400° F., which is refueling temperature, and no bowing of the assembly will take place. During an increase in temperature from refueling temperature to hot standby temperature, which is about 600° F., insert 76 will continue to elongate and expand between end walls 72 and 74 causing the assembly to bow radially inward, resulting in a lateral deflection of the assembly, the above core load pad (ACLP) pushing against the next radially inward assemblies and closing the assembly gaps. Thus the reaction loads on the bimetallic shielded assembly are at the TLP and at the inlet nozzle and the gap closure force is at the ACLP, closing the interassembly gaps and preventing any chance of an undesirable positive reactivity insertion during the approach to power operation.

The embodiments of the invention in which an exclusive property or privilege is claimed are defined as follows:

1. A self-bowing removable radial shielding assembly for a sodium-cooled-fast breeder reactor core comprising:
   a. a relatively short elongated base section having a lower nozzle portion for inserting the assembly into a reactor core support structure and an upper portion having an axial opening;
   b. an elongated flexible center section extending upward from the base section, the center section having an axial rod-shaped spine assembly having a lower end inserted into the axial opening in the base section and an upper end, said assembly being constructed of thermally sensitive bimetallic material whereby a predetermined increase in the temperature of the shielding assembly will cause the spine to bow laterally in a predetermined direction, a plurality of relatively short, tubular shaped shielding sections slidably mounted one above the other along the length of the axial spine, the shielding sections being movable longitudinally relative to each other as the spine bows in response to temperature variations; and c. a short top section above the center section, mounted on the upper end of the axial spine and attached thereto for retaining the tubular sections on the spine.

2. The shielding assembly of claim 1 wherein the rod shaped spine assembly consists of a main rod having upper and lower portions circular in cross-section and an elongated narrow central portion semicircular in cross-section with upper and lower transverse end walls, an elongated insert adjacent the narrow central portion semicircular in cross-section extending between the transverse walls in the cut-out portion, said main rod being constructed of a material having a relatively low coefficient of thermal expansion and said insert being constructed of material having a relatively high coefficient of thermal expansion, whereby as the temperature of the assembly increases the insert increases in length more rapidly than the main rod and expand against the transverse walls causing the spine assembly to bow transversely in the direction of the insert.

3. The shielding assembly of claim 2 wherein the nozzle portion of the base section contains a coolant inlet, the upper portion of the base contains a coolant distribution chamber and an axial coolant passage connects the two, a plurality longitudinal coolant channels extend upward from the chamber through upper portion of the base including an axial channel and a plurality of evenly spaced peripheral channels, the spine assembly of the center section contains an axial channel communicating with the axial channel in the base section, and the tubular shielding sections contain a plurality of evenly spaced peripheral longitudinal channels communicating with the peripheral channels in the base section and the top section contains a coolant outlet communicating with the axial channel in the spine assembly and a plurality of evenly spaced peripheral longitudinal channels between the channels in the tubular sections and the outlet for permitting a flow of coolant through the assembly.

4. The shielding assembly of claim 3 wherein each shielding section is slidably pinned to the adjacent sections including the base section and the top section whereby rotational movement of the shielding sections relative to each other and to the top and bottom sections is prevented.

5. The shielding assembly of claim 4 wherein the shielding section located at the above core load plane level contains a built-up portion about the exterior periphery for transmitting transverse forces to adjacent assemblies.

6. The shielding assembly of claim 5 wherein the top sections contains a built-up portion about the exterior periphery for transmitting load forces.

* * * * *